United States Patent [19]

Krause

[11] 3,846,832

[45] Nov. 5, 1974

[54] VACUUM TAPE THREADING SYSTEM

[76] Inventor: Konrad A. Krause, 870 E. El Camino Real, Mountain View, Calif. 94040

[22] Filed: Dec. 3, 1971

[21] Appl. No.: 204,524

Related U.S. Application Data

[63] Continuation-in-part of Ser. No. 843,452, July 22, 1969, Pat. No. 3,643,889.

[52] U.S. Cl. .................... 360/85

[51] Int. Cl. .................... G11b 15/32

[58] Field of Search .................... 242/192; 226/95, 97; 274/4 R, 4 D

[56] References Cited

UNITED STATES PATENTS

| | | | |
|---|---|---|---|
| 3,547,372 | 12/1970 | Barnett | 242/192 |
| 3,587,962 | 6/1971 | Herzhoff | 226/95 |
| 3,703,612 | 11/1972 | Higashida et al. | 242/192 |

*Primary Examiner*—Harry N. Haroian

*Attorney, Agent, or Firm*—Gregg, Hendricson & Caplan

[57] ABSTRACT

A tape threading system for use with magnetic tape or the like including a rotary vacuum disc with tape end sensing means for gripping the end of tape wound about a supply reel and winding such tape about the disc. A read head rides upon the tape wrapped about the vacuum disc and provision is made for moving the disc and head away from the supply reel as tape winds about the disc. The vacuum disc may also be employed to choose a tape cartridge from a rotary cartridge carriage to thus automate tape choice.

10 Claims, 7 Drawing Figures

INVENTOR
KONRAD A. KRAUSE
BY
Gregg Henderson & Caplan
ATTORNEYS

INVENTOR
KONRAD A. KRAUSE
BY
Gregg, Henderson & Caplan
ATTORNEYS

INVENTOR
KONRAD A. KRAUSE
BY
Gregg, Hendricson & Caplan
ATTORNEYS

VACUUM TAPE THREADING SYSTEM

The present application is a continuation-in-part of my prior copending U.S. patent application Ser. No. 843,452 filed in the U.S. Patent Office on July 22, 1969 for "AUTOMATIC TAPE THREADING SYSTEM AND APPARATUS", now U.S. Pat. No. 3,643,889.

BACKGROUND OF INVENTION

There have been developed a number of different tape threading systems by means of which magnetic or other types of tape wound about a supply reel may be threaded through the various rotors, capstans and the like, normally employed for guiding and driving tape past a read head. Reference is made to my above-noted patent application for at least a partial identification of various developments in this general field and description of a major improvement in the sensing, gripping and threading of tape. Further simplification of this last noted major improvement is provided herein.

Mechanical translation of physical elements is minimized by the present invention. Although it is herein provided that tape end sensing and tape gripping shall be accomplished in the same manner as described in my above-noted patent application, the present invention proceeds further in minimizing physical movement of elements. Only rotary motion of the means engaging and winding tape is herein provided. There is thus achieved a material simplification in the overall tape handling system provided by this invention. The invention hereof is applicable to all types of tape.

SUMMARY OF INVENTION

The present invention provides a rotatably mounted disc having vacuum apertures disposed about the periphery thereof for gripping tape, such as magnetic tape or the like, to wind the tape about the disc. The disc is also provided with tape end sensing means and reversing drive means. In common with by above noted prior invention, the supply reel is initially rotated in a reverse direction with tape sensing means on the vacuum disc then finding the end of the tape on the supply reel and signaling the drive means such that the supply reel is then rotated in the unwinding direction while at the same time the vacuum disc is rotated carrying the tape thereabout as a complete tape transport. A read head engages the tape wound about the vacuum disc and provision is made for moving the read head radially outward of the vacuum disc as tape turns increase about the disc. Rather than threading the tape about rollers, capstans and the like, the present invention provides for a direct traverse of tape from a supply reel to take-up reel without a free travel space there-between.

It is additionally provided by the present invention that the tape cartridges wherein tape supply reels are located may be multiply mounted upon a rotatable carriage so as to selectively dispose any desired row of cartridges in alignment with the above-noted vacuum disc. Provision may also be made for moving the vacuum disc and read head along such row of cartridges to thus dispose the disc in position for recording and/or reproduction of tape from any desired cartridge. This then affords an automatic tape selection system together with the automatic and highly simplified tape handling system of the present invention, particularly advantageous in computer-data recording and reproduction.

DESCRIPTION OF FIGURES

The present invention is illustrated as to particular preferred embodiments thereof in the accompanying drawings wherein.

DESCRIPTION OF PREFERRED EMBODIMENTS

The present invention is adapted for use with tape devices such as, for example, magnetic tape recording and playback equipment, No attempt is made herein to disclose or discuss all of the details of tape devices but, instead, reference is made to the prior art for description of such apparatus. Additionally, particular reference is made to my copending U.S. patent application Ser. No. 843,452 noted above for a description of tape end sensing mechanism and vacuum tape transport. The present invention incorporates the subject matter of such application and thus the disclosure of such application is herewith incorporated herein.

Figure 1:
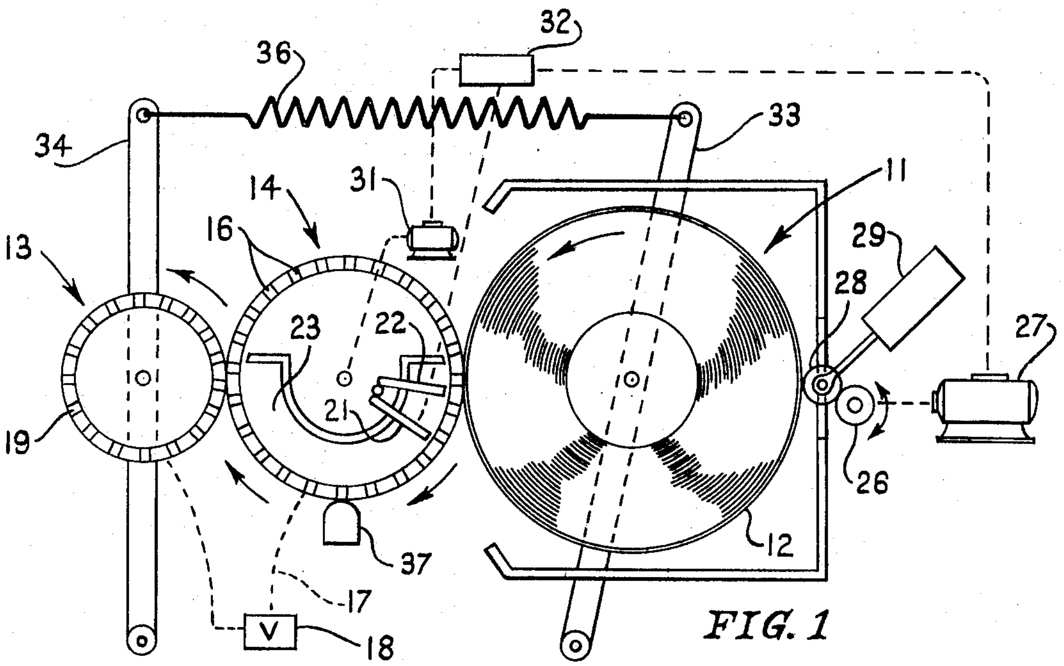
FIG. 1 is a schematic plan illustration of tape transport mechanism in accordance with the present invention.

Referring first to FIG. 1 there will be seen to be provided a rotary mounted supply reel 11 having tape 12 wound thereabout. There is also provided a take-up reel 13 and, in this embodiment of the present invention, tape transport is provided by a vacuum disc 14 mounted for rotation between the take-up and supply reels. The disc 14 is provided with peripheral apertures 16 and a vacuum connection 17 from a vacuum source 18 to the interior of the disc provides for drawing a vacuum through the apertures 16. The take-up reel 13 is similarly constituted in having peripheral apertures 19 therethrough and having the interior connected to the vacuum source 18 for drawing a vacuum through these apertures.

Figure 1A:
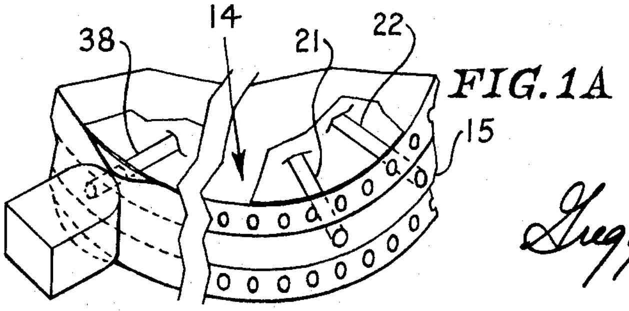
FIG. 1A is a partial perspective view of an embodiment of the vacuum disc of the present invention.

Provision is made for initially rotating the supply reel in a reverse direction tending to wind the tape on to the reel. This then causes the outer tape end or free tape end to move past a stationary portion 15 of the vacuum disc 14. This is illustrated in FIG. 1A wherein it will be seen that the vacuum drum may be provided as a central stationary portion and upper and lower rotatable portions. With this embodiment of the vacuum disc, the central stationary portion 15 thereof is provided with first and second vacuum sensors 21 and 22. These sensors 21 and 22 are operable in the manner described in my above-noted prior copending patent application and thus no further discussion of same is included herein other than to note that passage of the tape end thereover operates to produce signals from the sensors which are herein employed to reverse the direction of rotation of the tape reel 11. Thus the tape end engaging the vacuum disc 14 will be moved with the vacuum disc rotary portions as they turn in a clockwise direction as illustrated in FIG. 1. With a vacuum tape end detector, as illustrated, the passage of the free end of the tape over same produces signals indicating the presence of the tape end and the passage thereof and this latter signal is then employed to reverse the direction of the supply reel 11. This reversal is accomplished substantially instantaneously so that the tape end remains in contact with a portion of the periphery of the vacuum disc when the supply reel starts to rotate in the forward direction for unwinding the tape. The rotary portions of the vacuum disc rotating in a clockwise direction in FIG. 1 thus move the end of the tape which is consequently transported about some portion of the circumference of the vacuum disc to the take-up reel 13. The vacuum disc 14 is provided with a vacuum manifold 23 extending about a portion thereof as indicated in FIG. 1 so that vacuum is drawn through the apertures 16 in the rotary portions of the vacuum disc only about this portion of the periphery of the disc. Thus as the tape end reaches the take-up reel 13 which has a vacuum applied through the openings thereof, the vacuum disc releases the tape end which is then gripped by the vacuum of the take-up reel through the apertures 19 thereof so as to be wound about the take-up reel.

Further, with regard to tape end sensing, it is noted that either photo-electric sensing means or even mechanical motion means may be employed to sense the passage of the tape end across the vacuum disc and to reverse the rotation of the supply reel so that the vacuum disc will then pick up the tape end and draw it along the desired path thereof. Photo-electric sensing means are also described in my above-noted copending patent application and it is further noted with respect thereto that the entire vacuum disc may then rotate with a stationary sensor or sensors located behind same and operating through vacuum openings therethrough, or through a transparent vacuum disc.

With regard to the drive of elements of FIG. 1, it is noted that a variety of different possibilities exist. Thus, for example, there may be provided a capstan or axle 26 rotated by a reversible motor 27 for rotating the supply reel 11 as, for example, by means of a retractable roller 28 and operated by a solenoid 29 to releasably engage either the outer turn of tape on the supply reel or the reel itself. A drive motor 31 is provided for the vacuum disc 14 with control means 32 actuated by the tape end sensor 21 operating to start and control the motors 27 and 31. It is to be further appreciated that the supply reel drive may be turned off or disconnected after tape end sensing and movement of the tape end along the periphery of the vacuum disc and on to the hub of the take-up reel 13. The periphery of the vacuum disc may, for example, be made of rubber or the like and thus, when pressed against the tape, it will draw the tape from the supply reel and consequently rotate the supply reel so that it is not necessary then for the drive motor for the supply reel to continue operation during tape unwinding.

Provision is made herein for maintaining the vacuum disc in contact with the outer turn of tape on the supply reel and on the take-up reel. Thus the vacuum disc itself may provide the entire driving force required to move the tape from the take-up reel to the supply reel and vice versa during rewinding. The above-noted provision for engagement of the vacuum disc with the tape on the reels can be accomplished in a variety of ways such as, for example, by mounting the supply reel 11 and take-up reel 13 on pivotally mounted yokes 33 and 34, respectively. Free ends of these yokes may be drawn together by a constant tension spring 36.

A record and playback head 37 is mounted in position to engage tape on the periphery of the vacuum disc 14. The head 37 may be mounted for retraction away from the vacuum disc 14 during tape end sensing and tape pick-up by the vacuum disc. Control means may be provided for automatically moving the head into engagement with the tape after the tape has been moved past the head location as, for example, by time-delay means operating upon the tape end sensing signal.

Further with regard to recording and/or playback of the tape, it is noted that the tape may be passed over the head 37 on an air cushion. This is schematically illustrated in FIG. 1A at the left thereof showing the head 37 spaced slightly from the periphery of the vacuum disc 14. An air pressure connection 38 is shown to extend to an opening in the stationary portion 15 of the vacuum disc in alignment with the head 37. Thus as tape passes the head, air through the connection 38 will force the tape away from the disc and against the playback head. This then provides an air cushion behind the tape as a protection for the head and also obviates the necessity of retracting the head during tape pickup or rewind.

With regard to rewinding of tape once same has been substantially entirely wound upon the take-up reel, it is noted that means such as illustrated and described in my above-noted copending patent application may be employed to detect when the tape is almost entirely unwound from the supply reel. Such means may then produce a signal retracting the head 37 and reversing the direction of rotation of the vacuum disc while increasing the speed of rotation of same to rapidly rewind the tape onto the supply reel. It is furthermore noted that the supply reel may, as is conventional, be supplied in a cartridge or housing such as illustrated in FIG. 1.

The embodiment of the present invention schematically illustrated in FIG. 1 and described above, comprises a simplification over my prior invention in that the vacuum sensing and transport means does not translate but instead only rotates.

It is also possible in accordance with the present invention to provide the functions of tape end detection and pick-up, tape transport past a head, a tape winding upon a take-up reel by a single element substantially in the form of the vacuum disc illustrated in FIG. 1. In this respect reference is made to FIG. 2 of the drawings illustrating a supply reel 11 with tape 12 wound thereon and a vacuum disc 14. Both the supply reel and vacuum disc are mounted for rotation and provision is made for driving the supply reel by means of a resilient endless belt 41 from a drive capstan 42 in turn rotated by a reversible motor 43. The belt 41 extends about four pulley wheels or the like 44 illustrated to be disposed at the corners of a rectangle and the belt may extend about an axial protrusion of the supply reel so that movement of the belt will cause the supply reel to rotate. Preferably the belt extends about the back side of the tape on the supply reel to thus rotate the reel by engagement with the tape thereon, as illustrated. A rotatably mounted drive wheel 46 is adapted to be moved by a solenoid 47 into and out of contact with the drive capstan 42 and belt 41 at one of the pulley wheels 44.

Figure 2:
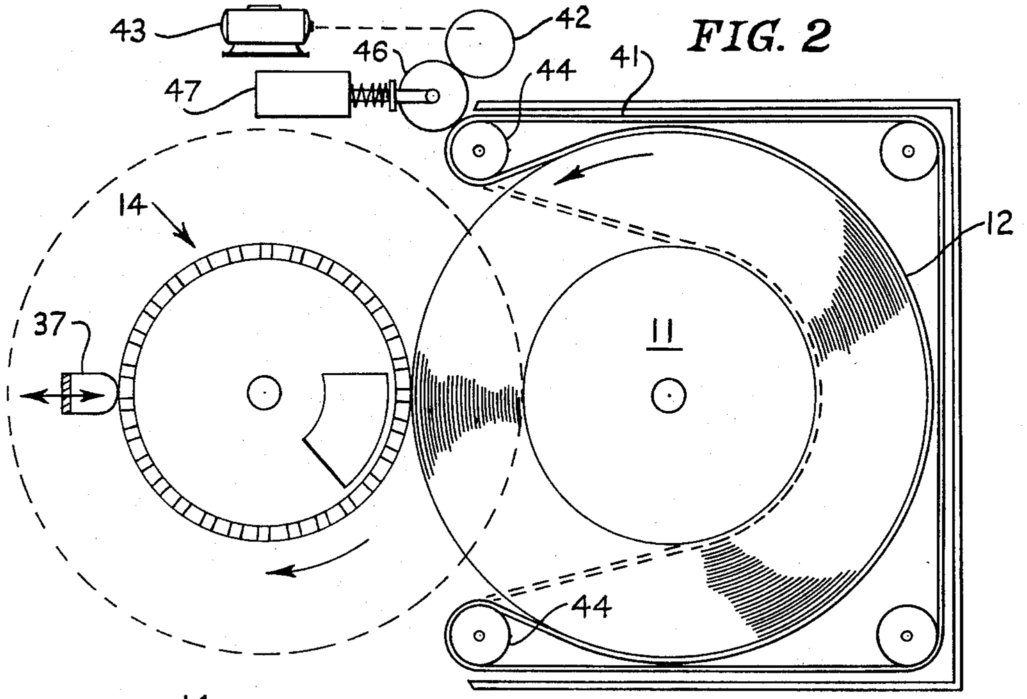
FIG. 2 is a schematic plan illustration of an alternative embodiment of the present invention.

With the vacuum disc 14 mounted for rotation about a fixed axis, it will be seen that the drive arrangement of FIG. 2 provides for controlled rotation of the supply reel while urging the supply reel against the vacuum disc and at the same time keeping the layers of tape tightly packed. The periphery of the vacuum disc may be formed of a material having a substantial friction in engagement with the magnetic tape on the supply reel as, for example, a rubber coating or the like so that rotation of the supply reel engaging the vacuum disc will cause the vacuum disc to rotate. The free end of the tape 12 will be gripped by the vacuum disc through the action of the vacuum drawn through the peripheral holes 16 therein and thus, as the vacuum disc is rotated, the tape will be wound thereabout. As the tape unwinds from the supply reel, such reel will move to the left in FIG. 2 toward the vacuum disc until substantially all the tape is wound upon the vacuum disc. This movement may be accommodated by mounting the supply reel axle in a slide block for movement in a slot or slide in the tape cartridge carrying the reel. Provision is made for reading or recording upon the tape by a record/playback head 37 mounted to contact tape on the vacuum disc. This head is mounted to move to the left in FIG. 2 as tape is wound on the vacuum disc while at all times maintaining contact with the tape. Various mechanical arrangements for mounting the head 37 are possible and in this respect reference is made to the following description of additional illustrations of the present invention. It is also possible to provide for separate driven rotation of the vacuum disc 14 in order to achieve automatic tape end detection and pick-up in the manner described above in connection with the illustration of FIG. 1. It will, however, be appreciated that tape travel in the embodiment of the present invention illustrated in FIG. 2 extends only from the periphery of the tape wound on the supply reel to the periphery of the vacuum disc. Thus if the vacuum disc is not driven no complicated tape threading is required and thus it is quite simple for an operator to merely grasp the end of the tape on the supply reel and place it against the periphery of the vacuum disc where it will be held by the vacuum thereof. The motor may then be started to pass the tape over the head 37 for recording or playback. The head is retractable for rewinding and during tape pick-up by the vacuum disc. No attempt is made in connection with the embodiment of FIG. 2 to illustrate or describe control means for the system thereof. It will be appreciated that suitable control means are to be provided such as those generally described in connection with FIG. 1.

Figure 3:
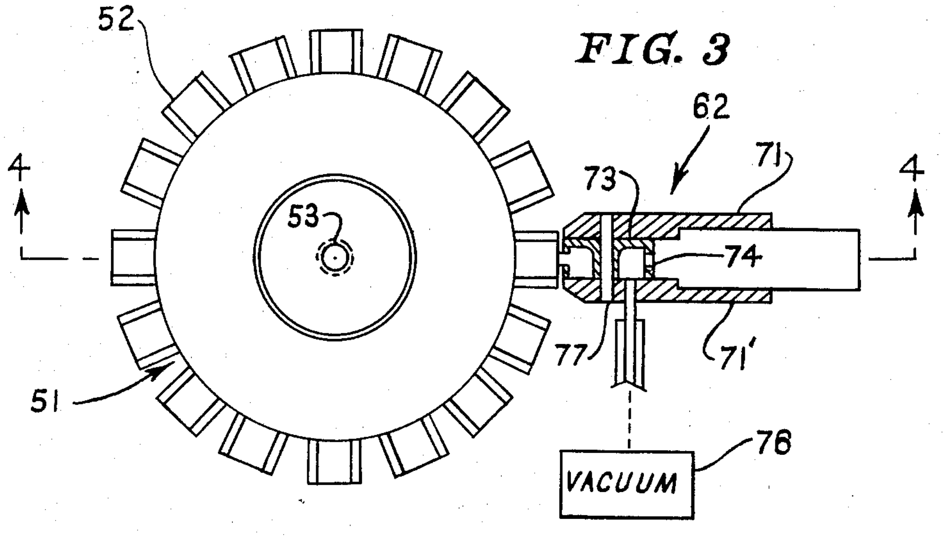
FIG. 3 is a side elevational view partially in section and illustrating multiple cartridge tape selection apparatus and tape transport mechanism in accordance with the present invention.
Figure 4:
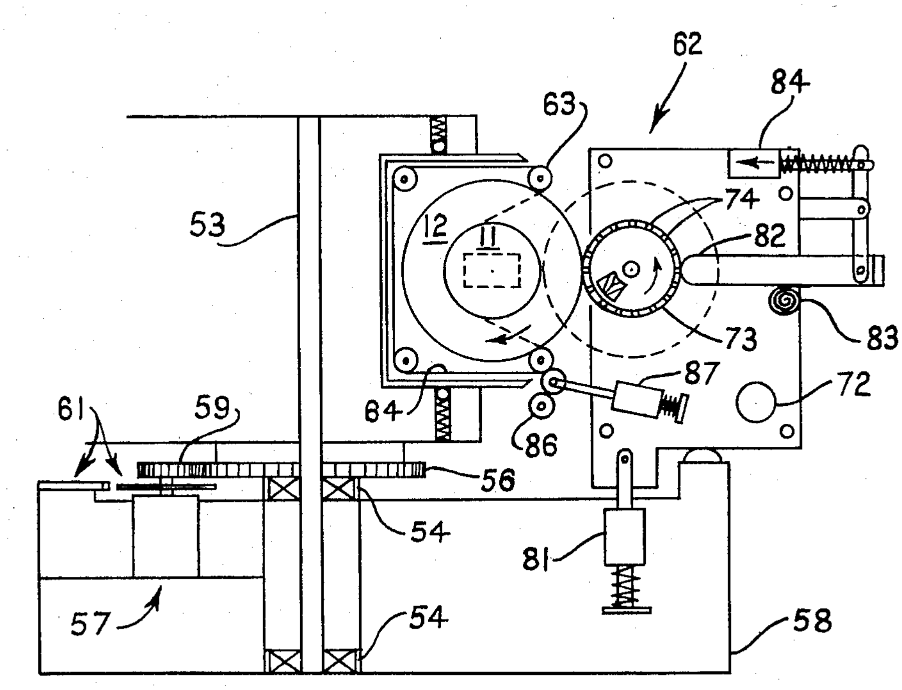
FIG. 4 is a transverse sectional view in the plane 4—4 of FIG. 3.

The present invention is also particularly well adapted for utilization with a multiple cartridge drum or the like wherein tape selection is provided as well as automatic tape threading. In this respect reference is made to FIGS. 3 and 4 generally illustrating a system incorporating automatic tape threading and transport such as described in connection with FIG. 2 and also incorporating tape selection means. Referring now to FIGS. 3 and 4 there will be seen to be illustrated a rotatably mounted drum 51 carrying a plurality of tape cartridges 52 about the periphery thereof. The drum 51 is mounted upon an axle 53 carried by bearings 54 and has a drive gear 56 secured to the axle. A stepping motor 57 mounted on a base 58 carrying the above-noted drum bearings controllably rotates a gear 59 meshing with the drive gear 56. The gear drive illustrated is a conventional no backlash gear, such as a bevel gear, or worm gear drive, to provide repeated angular position and to accept and retain the cartridge to the matching reference surfaces 71–71′. The motor 57 is controlled to step the drum to successive desired angular positions by means which may include a sensing gear and magnetic sensor combination 61.

The tape cartridge drum 51 is adapted to be controllably rotated to position any desired tape cartridge 52 thereon in alignment with a tape handling unit 62 which in many respects is similar to the embodiment of the invention illustrated in FIG. 2 and described above. Individual tape cartridges 52 each include a rotary mounted supply reel 11 having tape 12 wound thereabout and four rotatably mounted pulley wheels 63 about which there is stretched a resilient drive belt 64, as illustrated. The resilient belt 64 engages tape wound on the supply reel 11 on the back side thereof toward the interior of the cartridge so as to urge the reel outwardly of the cartridge. It will be appreciated that rotary mounting of the supply reel also accommodates translation of the reel as, for example, by mounting the cartridge axle in slide blocks in the cartridge sides.

Considering now the tape threading playback system 62, it is noted that same is provided as a unit having upper and lower plates 71 and 71′ mounted upon a fixed shaft 72 for pivotal motion toward and away from the cartridge drum 51. Between the plates 71 and 71′ there is defined a vacuum disc 73 having peripheral openings 74 with the interior of the disc communicating with a vacuum source 76. The vacuum disc 73 is mounted for rotation on a central shaft 77. The disc 73, as illustrated in FIG. 3, has the edge thereof extending slightly outwardly from the plates for engagement with the periphery of the tape wound upon the supply reel of a cartridge 52 aligned with the tape threading and playback mechanism 62. Provision is made for tilting or pivoting the unit 62 about the shaft 72 as by a spring loaded solenoid 81 mounted on the base 58 and pivotally connected to the unit 62. A record and playback head 82 is slidably mounted between the plates 71 and 71′ for movement toward and away from the vacuum disc 73 with a constant force spring 83 urging the head against tape wound about the vacuum disc and a solenoid 84 connected through linkage to the head for retracting the head during threading and rewind operations. Tape end sensing and control as described above is also preferably included.

The supply reel 11 is adapted to be rotated by the resilient belt 64, as noted above, and this may be accomplished from a drive capstan 86 via a drive wheel or the like carried by a solenoid 87 and adapted to retractably engage the capstan and belt.

It will be seen that the structure of FIGS. 3 and 4 provide mechanism for rotating any one of a number of tape cartridges into position for recording and/or playback. The transport of tape from the supply reel of the cartridge past a head is carried out much in the same manner as described above in connection with the structure of FIG. 2. Appropriate control circuitry may be provided for operating the cartridge drum 51 and for actuating and operating the unit 62 so that it is not necessary for an operator to physically touch tape to be played or rewound.

Figure 5:
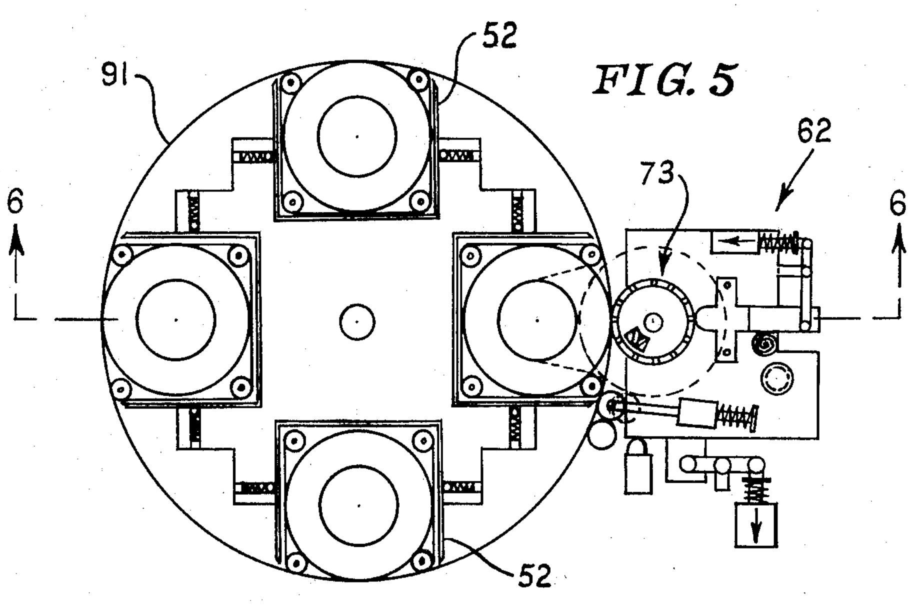
FIG. 5 is a central sectional view in elevation through an alternative embodiment of tape selection and tape transport mechanism in accordance with the present invention.
Figure 6:
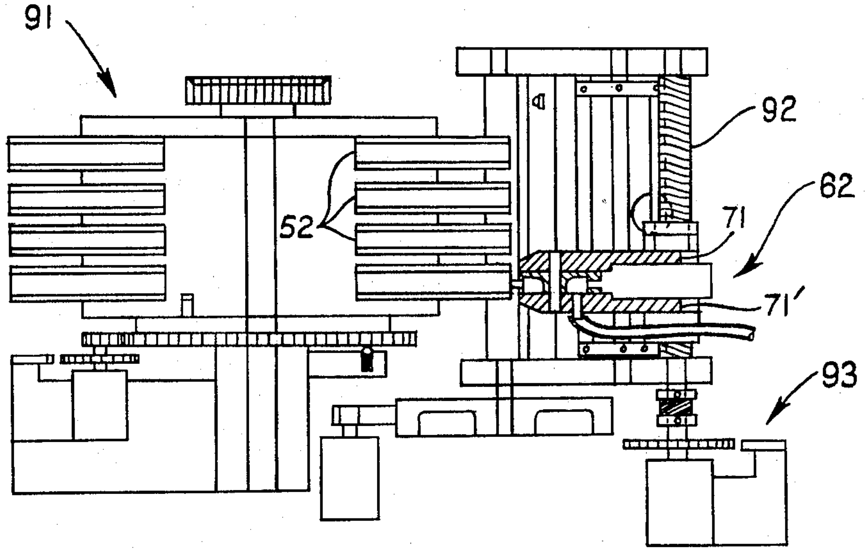
FIG. 6 is a sectional view taken in the plane 6—6 of FIG. 5.

There is illustrated in FIGS. 5 and 6 a further embodiment of the present invention employing substantially the same tape threading and playback unit 62 as is illustrated in FIGS. 3 and 4 but, in this instance, mounted for movement longitudinally of a rotatably mounted cartridge drum 91. The drum 91 is adapted to hold or mount a number of tape cartridges 52 about the periphery thereof, as illustrated in FIG. 5, with the reel axes of the cartridges parallel to the drum axis. A number of cartridges are mounted on coincident axes, as illustrated in FIGS. 5 and 6. The drum may thus be rotated to dispose any one of the four illustrated groups of cartridges directed toward the tape handling unit 62 and the latter is mounted upon a lead screw 92 driven by a motor 93 to controllably move the unit 62 axially of the drum 91 so as to align the vacuum disc 73 with any desired one of the cartridges of the group facing the unit 62. The lead screw illustrated uses the conventional preloading solution where the nuts are rotated toward each other, or a helical type rack and pinion is used, to provide a no backlash linear motion, to repeated positioning; and to accept and retain the cartridge to the matching reference surfaces 71 and 71'.

By providing for movement of the tape handling unit 62 the practical capacity of the system is increased in the number of tape cartridges which may be selected by the invention.

Operation of the embodiment of the invention illustrated in FIGS. 5 and 6 is believed to be sufficiently clear without detailed description, particularly in view of the prior description of operation of other embodiments of the present invention. It is, however, particularly noted that in each of the embodiments of the present invention it is intended that there may be provided automatic tape end sensing and pick-up on the vacuum disc such that the free end of a tape on a supply reel adjacent the disc will be located by the tape end sensing means and will be gripped by the vacuum of the disc to be held against the disc periphery so that reversing the direction of rotation of the supply reel and disc then causes the tape to be wound about the vacuum disc and thus past the playback and/or recording head. Provision is also preferably made to stop tape unwinding from the supply reel of the cartridge before the inner tape end leaves such supply reel. Such means may include photocells or the like such as illustrated and described in my above-noted copending patent application and such means then operate to produce a control signal that retracts the head out of contact with the tape and reverses the direction of rotation of the supply reel so the tape is then rewound upon the supply reel. Such rewinding is normally accomplished at a much accelerated rate.

It is also within the scope of the invention to have the FIG. 1 principle incorporated in the embodiments of multiple cartridge-tray construction as shown in FIGS. 3 to 6.

Although there have been described above a number of embodiments of the present invention, it is to be appreciated that the other alternatives are possible and numerous variations in individual elements and relationships therebetween fall within the proper scope of the present invention. It is thus not intended to limit the invention by the details of illustration or precise terms of description.

What is claimed is:

1. A tape transport system for tape apparatus having a record reproduce head and a tape supply reel with drive means for rotating the reel comprising, a rotatably mounted disc having vacuum openings in the periphery thereof, said disc having a stationary portion and at least one rotatable portion, vacuum connections to said disc for drawing a vacuum through said peripheral openings to hold tape against the disc, tape end sensing means disposed in the stationary portion of said disc directed toward said tape supply reel and producing a signal upon passage of a free tape end thereover, said drive means initially rotating said supply reel in the tape wind direction to thus pass the free tape end over said sensing means, means applying the tape end sensing signal to said drive means for reversing the drive means to rotate the supply reel in a taped unwind direction, and resilient means urging said disc and supply reel with the tape thereon into peripheral engagement for rotating the disc by rotation of supply reel whereby tape on the reel is unreeled by the disc and passed over said head.

2. The tape transport system of claim 1 further defined by said resilient means including an endless resilient belt extending in stretched condition about wheels and engaging a side of the tape on the supply reel opposite from said disc, and means mounting said supply reel for translation toward and away from said disc whereby the outer turn of tape on the reel is maintained in contact with the disc.

3. The improvement of claim 1 further defined by said record/reproduce head being disposed adjacent said vacuum disc and spaced slightly therefrom, an air pressure connection extending through the stationary portion of said vacuum disc toward said head for pressing tape on an air cushion against the head as the tape is moved past the head by the disc, and a rotary mounted take-up reel disposed to receive and wind tape transported past said head by said disc.

4. Tape transport mechanism for tape apparatus having a rotatably mounted supply reel with tape wound thereabout, drive means for rotating said supply reel, and a tape head spaced from said supply reel and adapted to have tape passed thereover for tape recording and playback comprising a rotary mounted disc disposed at least in part between said tape head and supply reel for transporting tape from the supply reel across said tape head, said disc having vacuum openings through the periphery thereof and connections to a vacuum source for drawing a vacuum through the peripheral openings, resilient means urging said disc and supply reel toward each other whereby rotation of said supply reel rotates said disc and the tape on the reel is held against the disc to unwind tape from the supply reel and transport tape across the tape head.

5. The mechanism of claim 4 further defined by said disc being adapted to wind tape thereabout as the tape is unwound from said supply reel and resilient means mounting said head and urging same against tape wound about the disc.

6. In a tape system having a rotary mounted supply reel adapted to have tape wound thereabout, drive means for rotating in said supply reel, and a tape head spaced from said supply reel and adapted to have tape passed thereover for tape recording and playback, the improvement comprising a rotary mounted vacuum disc having peripheral openings and connected to a source of vacuum for drawing a vacuum through said openings, said vacuum disc having stationary tape end sensing means adjacent said supply reel, said vacuum disc being mounted in position to engage the periphery of tape wound upon said supply reel for gripping such tape by vacuum and being disposed adjacent said tape head to move tape past the head as the vacuum disc rotates, means urging said vacuum disc and supply reel toward each other to engage the disc with tape on the supply reel, and said drive means being reversible and controlled by said tape sensing means to rotate the supply reel in the wind direction until the tape end touching the vacuum disc is sensed and then reversing the direction of supply reel rotation while rotating said vacuum disc to unwind tape from the supply reel by the vacuum disc.

7. The improvement of claim 6 further defined by means mounting a plurality of supply reels and control means therefor moving a selected reel into position for engaging tape wound thereon with said vacuum disc, and means controllably retracting said vacuum disc from position for engagement with tape on a supply reel.

8. Tape recording and playback apparatus comprising a rotary mounted drum adapted to carry a plurality of tape cartridges with each cartridge including a tape supply reel with tape wound thereabout and means engaging the reel for rotating the wheel, control means for angularly positioning said drum to place a selected cartridge thereon at a first location, a tape handling and playback unit mounted for controlled movement into and out of said first location and including a rotary mounted disc having peripheral openings therethrough and connected to a vacuum source for drawing a vacuum through said openings, said disc engaging tape on a cartridge supply reel in the first location of the unit, and a tape head urged toward said disc to engage tape thereon, means urging said disc and supply reel together, and drive means for controllably rotating said supply reel to thus unwind tape therefrom and wind such tape upon said disc.

9. The apparatus of claim 8 further defined by said drum being adapted to mount a first plurality of tape cartridges on a single axis parallel to the drum axis and further pluralities of tape cartridges disposed on other parallel axes, and means controllably moving said tape handling and playback means axially of said drum for positioning a selected tape cartridge and the last mentioned means at said first location.

10. Tape transport means for apparatus including a rotary mounted supply reel and a record/reproduce tape head comprising a rotary mounted vacuum disc having peripheral openings and vacuum connections to the interior thereof for drawing a vacuum through the openings, said disc being disposed in tangential engagement with the outer turn of tape on said supply reel, light sensitive tape end sensing means disposed within said disc and directed toward said supply reel, reversible drive means rotating said supply reel first in a wind direction to thus pass the outer free end of tape on the reel across said vacuum disc, whereby said tape end sensing means senses said tape end, control means reversing said drive means upon tape end sensing for rotating said supply reel in a tape-unwind direction with the tape end held by vacuum on said disc, and means rotating said vacuum disc at least during tape unwinding from said supply reel.

* * * * *